(12) United States Patent
Puc et al.

(10) Patent No.: US 7,742,223 B2
(45) Date of Patent: Jun. 22, 2010

(54) SYSTEM AND METHOD FOR IMPLEMENTING A BOOSTERLESS OPTICAL COMMUNICATION SYSTEM

(75) Inventors: Andrej B. Puc, Allen, TX (US); Do Il Chang, Allen, TX (US); Andrzej S. Kaminski, Allen, TX (US)

(73) Assignee: Xtera Communications, Inc., Allen, TX (US)

( * ) Notice: Subject to any disclaimer, the term of this patent is extended or adjusted under 35 U.S.C. 154(b) by 0 days.

(21) Appl. No.: 11/277,332

(22) Filed: Mar. 23, 2006

(65) Prior Publication Data

US 2007/0223084 A1 Sep. 27, 2007

(51) Int. Cl.
*H04B 10/17* (2006.01)
*H04B 10/12* (2006.01)

(52) U.S. Cl. ...................................... 359/334
(58) Field of Classification Search ................. 398/160; 359/334
See application file for complete search history.

(56) References Cited

U.S. PATENT DOCUMENTS

| | | | | |
|---|---|---|---|---|
| 4,560,246 | A | 12/1985 | Cotter | 350/96.16 |
| 5,566,381 | A | 10/1996 | Korotky | 359/183 |
| 5,969,840 | A * | 10/1999 | Roberts | 398/32 |
| 6,081,366 | A | 6/2000 | Kidorf et al. | 359/341 |
| 6,191,854 | B1 | 2/2001 | Grasso et al. | 356/341 |
| 6,292,288 | B1 * | 9/2001 | Akasaka et al. | 359/334 |
| 6,512,628 | B1 * | 1/2003 | Terahara et al. | 359/334 |
| 6,618,176 | B2 * | 9/2003 | Alexander et al. | 398/91 |
| 6,714,342 | B2 | 3/2004 | Islam et al. | 359/334 |
| 6,771,413 | B2 * | 8/2004 | Cornwell et al. | 359/337.1 |
| 6,782,151 | B2 | 8/2004 | Sasaoka et al. | 385/15 |
| 6,798,564 | B2 * | 9/2004 | Inoue et al. | 359/334 |
| 6,819,479 | B1 * | 11/2004 | Islam et al. | 359/337 |
| 6,825,973 | B1 * | 11/2004 | Puc et al. | 359/334 |
| 6,850,677 | B2 | 2/2005 | Dennis et al. | 385/123 |
| 7,068,938 | B1 * | 6/2006 | Islam et al. | 398/83 |
| 7,110,680 | B2 * | 9/2006 | Hoshida et al. | 398/181 |
| 2002/0141008 | A1 * | 10/2002 | Chbat et al. | 359/110 |
| 2002/0154356 | A1 * | 10/2002 | Krummrich | 359/124 |
| 2003/0058494 | A1 * | 3/2003 | Roberts et al. | 359/115 |
| 2003/0076577 | A1 * | 4/2003 | Dominic et al. | 359/334 |

(Continued)

FOREIGN PATENT DOCUMENTS

JP 2004-297832 10/2004

OTHER PUBLICATIONS

Agrawal, Govind. Fiber-Optic Communication Systems. 3rd Edition. Wiley-Interscience. 2002.*

(Continued)

*Primary Examiner*—Eric Bolda
(74) *Attorney, Agent, or Firm*—Workman Nydegger (57) ABSTRACT

An optical communication system includes a transmission fiber that is operable to receive at least one optical signal and at least one pump signal. The optical signal includes one or more optical signal wavelengths and a power level at approximately a minimum threshold power level. The pump signal co-propagates with at least a portion of the optical signal over at least a portion of the transmission fiber. In one particular embodiment, the pump signal operates to amplify the optical signal to approximately a maximum threshold power level as the pump signal and the optical signal traverse the portion of the transmission fiber.

24 Claims, 2 Drawing Sheets

U.S. PATENT DOCUMENTS

| | | |
|---|---|---|
| 2004/0208577 A1* | 10/2004 | Cahill .......................... 398/83 |
| 2004/0212871 A1 | 10/2004 | Hoshida et al. ............. 359/333 |
| 2004/0264968 A1* | 12/2004 | Cornwell et al. .............. 398/92 |
| 2005/0025501 A1 | 2/2005 | Bickham .................... 398/188 |

OTHER PUBLICATIONS

Maeda, H., et al., "Ultra-long-span 500 km 16 x 10 Gbit/s WDM unrepeatered transmission using RZ-DPSK format," Electronics Letters vol. 41, No. 1, 2 pages, Jan. 6, 2005.

Labrunie, L., et al., "500 km WDM 12 x 10 Gbit/s CRZ repeaterless transmission using second order remote amplification," Electronics Letters vol. 39, No. 19, 2 pages, Sep. 18, 2003.

Hansen, P.B. et al., "Rayleigh Scattering Limitations in Distributed Raman Pre-Amplifiers," IEEE Photonics Technology Letters, vol. 10, No. 1, pp. 159-161, Jan. 1, 1998.

Notification of Transmittal of the International Search Report and the Written Opinion of the International Searching Authority, or the Declaration, PCT/US07/04420, 6 pages, Date Mailed Sep. 15, 2008.

* cited by examiner

FIG. 4 ated from an end terminal that includes a booster amplifier
SYSTEM AND METHOD FOR IMPLEMENTING A BOOSTERLESS OPTICAL COMMUNICATION SYSTEM

TECHNICAL FIELD OF THE INVENTION

This invention relates in general to the field of communication systems and, more particularly, to a system and method for implementing a boosterless optical communication system.

BACKGROUND OF THE INVENTION

Conventional optical communication systems typically implement one or more booster amplifiers to amplify an optical communication signal to approximately a maximum threshold power level before launching such optical signal into a communication span or transmission fiber. These systems seek to maximize the power level of the optical communication signal in preparation for transmission over the transmission fiber to pre-compensate for losses associated with the transmission fiber.

SUMMARY OF THE DISCLOSURE

According to one embodiment, an optical communication system comprises a transmission fiber that is operable to receive at least one optical signal and at least one pump signal. The optical signal comprises one or more optical signal wavelengths and a power level at approximately a minimum threshold power level. The pump signal co-propagates with at least a portion of the optical signal over at least a portion of the transmission fiber. In one particular embodiment, the pump signal operates to amplify the optical signal to approximately a maximum threshold power level as the pump signal and the optical signal traverse the portion of the transmission fiber.

According to another embodiment, an unrepeatered optical communication system comprises a boosterless end terminal that is operable to generate at least one optical signal and to introduce the optical signal to a first end of a transmission fiber. The optical signal introduced to the first end of the transmission fiber comprises a power level at approximately a minimum threshold power level. The system further comprises a pump source coupled to the transmission fiber. The pump source is operable to generate at least one pump signal and to introduce the pump signal to the transmission fiber. In one particular embodiment, the pump signal operates to amplify the optical signal to approximately a maximum threshold power level as the pump signal traverses the portion of the transmission fiber.

Depending on the specific features implemented, particular embodiments of the present disclosure may exhibit some, none, or all of the following technical advantages. Various embodiments may be capable of increasing the total reach of the optical system. Other embodiments may be capable of extending and/or delaying the point at which the signal reaches the maximum power level within a communication span or optical fiber. Other technical advantages will be readily apparent to one skilled in the art from the following figures, description and claims. Moreover, while specific advantages have been enumerated, various embodiments may include all, some or none of the enumerated advantages.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DETAILED DESCRIPTION OF EXAMPLE EMBODIMENTS

Particular examples and dimensions specified throughout this document are for illustrative purposes only, and are not intended to limit the scope of the present disclosure. In particular, this disclosure is not limited to unrepeatered optical communication systems. The teachings of the present disclosure may be used in any optical communication system where it is desired to extend the reach or distance between optical devices. Moreover, the illustrations in FIGS. 1 through 4 are not intended to be to scale.

Figure 1:
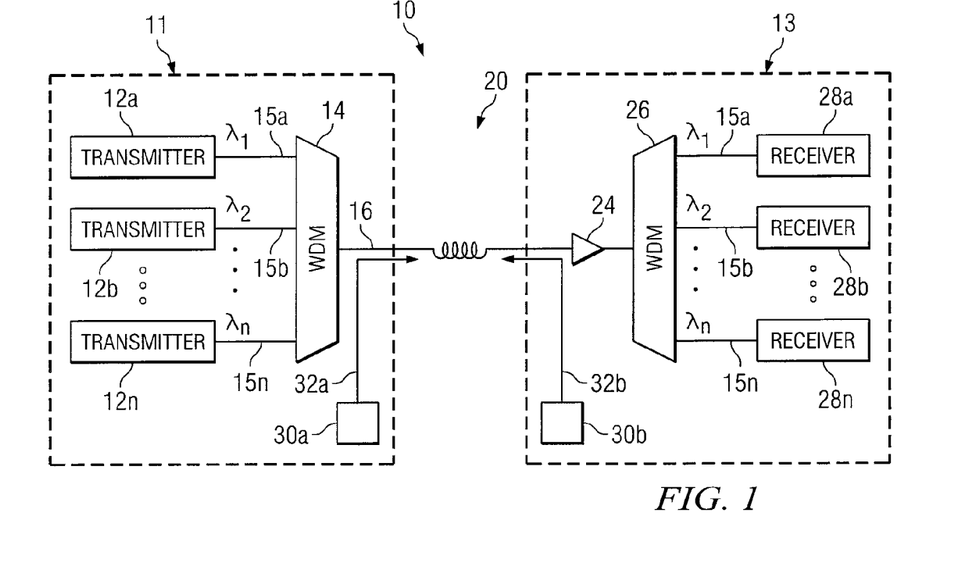
FIG. 1 is a block diagram showing at least a portion of an unrepeatered optical communication system operable to facilitate communication of one or more multiple wavelength signals.

FIG. 1 is a block diagram showing at least a portion of an unrepeatered optical communication system 10 operable to facilitate communication of one or more multiple wavelength signals 16. An "unrepeatered optical communication system" refers to an optical communication system having an optical communication span that includes only passive optical components between end terminals. That is, the communication span of an unrepeatered system is substantially free from components that require electrical power.

In this example, system 10 includes a plurality of transmitters 12a-12n operable to generate a plurality of optical signals (or channels) 15a-15n, each comprising a center wavelength of light. In some embodiments, each optical signal 15a-15n comprises a center wavelength that is substantially different from the center wavelengths of other signals 15. As used throughout this document, the term "center wavelength" refers to a time-averaged mean of the spectral distribution of an optical signal. The spectrum surrounding the center wavelength need not be symmetric about the center wavelength. Moreover, there is no requirement that the center wavelength represent a carrier wavelength. Transmitters 12 can comprise any device capable of generating one or more optical signals. Transmitters 12 can comprise externally modulated light sources, or can comprise directly modulated light sources.

In one embodiment, transmitters 12 comprise a plurality of independent light sources each having an associated modulator, with each source being operable to generate one or more optical signals 15. Alternatively, transmitter 12 could comprise one or more light sources shared by a plurality of modulators. For example, transmitter 12 could comprise a continuum source transmitter including a mode-locked source operable to generate a series of optical pulses and a continuum generator operable to receive a train of pulses from the mode-locked source and to spectrally broaden the pulses to form an approximate spectral continuum of optical signals. In that embodiment, a signal splitter receives the continuum and separates the continuum into individual signals each having a center wavelength. In some embodiments, transmitter 12 can also include a pulse rate multiplexer, such as a time division multiplexer, operable to multiplex pulses received from the mode locked source or the modulator to increase the bit rate of the system.

Transmitter 12, in some cases, may comprise a portion of an optical regenerator. That is, transmitter 12 may generate optical signals 15 based on electrical representations of electrical or optical signals received from other optical communication links. In other cases, transmitter 12 may generate optical signals 15 based on information received from sources residing locally to transmitters 12. Transmitter 12 could also comprise a portion of a transponder assembly (not explicitly shown), containing a plurality of transmitters and a plurality of receivers.

In various embodiments, transmitters 12 may include a forward error correction (FEC) module capable improving the Q-factor of signals 15 and the bit-error rate of system 10. For example, the FEC module may encode an FEC sequence, such as, Reed Solomon coding, Turbo Product Codes coding, Concatenated Reed-Solomon coding, or other algorithms capable of improving the Q-factor of signals 15 and the bit error rate of system 10. As used throughout this document, the term "Q-factor" refers to a metric for determining the quality of the signal communicated from a transmitter. The "Q-factor" associated with optical signals 15 communicated from transmitters 12 refers to the difference of the mean value of the high signal values ($M_H$) and the mean value of the low signal values ($M_L$) associated with an optical signal over the sum of the standard deviation of the multiple highs ($\Delta_H$) and the multiple lows $\Delta_L$). The value of the Q-factor can be expressed in $dB_{20}$. In equation form, this relationship is expressed as:

$$Q = [M_H - M_L] \div [\Delta_H + \Delta_L]$$

In the illustrated embodiment, system 10 also includes a combiner 14 operable to receive optical signals 15a-15n and to combine those signals into a multiple wavelength signal 16. As one particular example, combiner 14 could comprise a wavelength division multiplexer (WDM). The terms wavelength division multiplexer and wavelength division demultiplexer as used herein may include equipment operable to process wavelength division multiplexed signals and/or equipment operable to process dense wavelength division multiplexed signals.

System 10 communicates multiple wavelength signal 16 over an optical communication span 20. Although this example includes one optical communication span 20, any additional number of spans can be used without departing from the scope of the present disclosure. Communication span 20 can comprise, for example, standard single mode fiber (SMF), dispersion shifted fiber (DSF), non-zero dispersion shifted fiber (NZDSF), dispersion compensating fiber (DCF), pure-silica core fiber (PSCF), or another fiber type or combination of fiber types. In various embodiments, span 20 can comprise a span length of, for example, 80 kilometers or more, 150 kilometers or more, 300 kilometers or more, or any other appropriate length. In this particular embodiment, span 20 of system 10 comprises a span length of at least 400 kilometers.

Communication span 20 could comprise, for example, a unidirectional span or a bi-directional span. Span 20 could comprise a point-to-point communication link, or could comprise a portion of a larger communication network, such as a ring network, a mesh network, a star network, or any other network configuration. For example, communication span 20 could comprise one span or link of a multiple link system, where each link couples to other links through, for example, optical regenerators.

In this embodiment, a separator 26 separates individual optical signal 15a-15n from multiple wavelength signal 16 received at the end of span 20. Separator 26 may comprise, for example, a wavelength division demultiplexer (WDM). Separator 26 communicates individual signal wavelengths or ranges of wavelengths to a bank of receivers 28 and/or other optical communication paths. One or more of receivers 28 may comprise a portion of an optical transceiver operable to receive and convert signals between optical and electrical formats.

System 10 may further include one or more optical amplifiers coupled to communication span 20. In this example, system 10 includes a preamplifier 24 operable to amplify signal 16 received from fiber span 20 prior to communicating signal 16 to separator 26. Although system 10 includes a preamplifier 24, system 10 could include any other amplifier and/or preamplifier 24 could be eliminated without departing from the scope of the present disclosure.

Amplifier 24 could comprise, for example, one or more stages of Raman amplification, rare earth doped amplification stages, such as erbium doped or thulium doped stages, semiconductor amplification stages or a combination of these or other amplification stage types. In some embodiments, amplifier 24 could comprise a bi-directional Raman amplifier. Throughout this document, the term "amplifier" denotes a device or combination of devices operable to at least partially compensate for at least some of the losses incurred by signals while traversing all or a portion of system 10. Likewise, the terms "amplify" and "amplification" refer to offsetting at least a portion of losses that would otherwise be incurred.

An amplifier may, or may not impart a net gain to a signal being amplified. Moreover, the terms "gain" and "amplify" as used throughout this document do not (unless explicitly specified) require a net gain. In other words, it is not necessary that a signal experiencing "gain" or "amplification" in an amplifier stage experience enough gain to overcome all losses in the amplifier stage or in the fiber connected to the amplifier stage. As a specific example, distributed Raman amplifier stages typically do not experience enough gain to offset all of the losses in the transmission fiber that serves as a gain medium. Nevertheless, these devices are considered "amplifiers" because they offset at least a portion of the losses experienced in the transmission fiber.

Depending on the amplifier type chosen, amplifier 24 could comprise a wide band amplifier operable to amplify all optical signals 15a-15n received. Alternatively, amplifier 24 could comprise a parallel combination of narrower band amplifier assemblies, wherein each amplifier in the parallel combination is operable to amplify a portion of the wavelengths of multiple wavelength signal 16. In that case, system 10 could incorporate signal separators and/or signal combiners surrounding the parallel combinations of amplifier assemblies to facilitate amplification of a plurality of groups of wavelengths for separating and/or combining or recombining the wavelengths for communication through system 10.

In the illustrated embodiment, transmitters 12, combiner 14, and pump source 30a reside within a first terminal 11, while receivers 28, separator 26, pre-amplifier 24, and pump source 30b reside within a second terminal 13. Although in this example terminal 11 includes transmitters 12, combiner 14, and pump source 30a, and terminal 13 includes receivers 28, separator 26, amplifier 24 and pump source 30b, terminals 11 and 13 can each include any combination of transmitters, receivers, combiners, separators, pump sources, and/or amplifiers without departing from the scope of the present disclosure. Additionally, terminals 11 and 13 may include any other optical component. In some cases, terminals 11 and 13 can be referred to as end terminals. The phrase "end terminal" refers to devices operable to perform optical-to-electrical and/or electrical-to-optical signal conversion and/or generation.

In various embodiments, end terminals 11 and 13 can include one or more dispersion compensating elements capable of at least partially compensating for chromatic dispersion associated with signal 16. In some embodiments, the dispersion compensating element can comprise a dispersion length product that approximately compensates for the dispersion accumulated by optical signal 16 while traversing span 20 of system 10. In other embodiments, at least a portion of a gain medium of amplifier 24 may comprise a dispersion compensating fiber that is capable of at least partially compensating for chromatic dispersion associated with signal 16. In those embodiments, the dispersion compensating fiber can comprise a slope of dispersion that is equal to and opposite from the slope of chromatic dispersion associated with multiple wavelength signal 16.

In this particular embodiment, system 10 includes a first pump source 30a capable of generating a first pump signal 32a for introduction to span 20 and a second pump source 30b capable of generating a second pump signal 32b for introduction to span 20. Although this example includes two pump sources 30 and two pump signals 32, any other number of pump sources and/or pump signals could be used, or one or more of pump sources 30 and/or pump signals 32 could be excluded without departing from the scope of the present disclosure. Pump signals 32a and 32b can each comprise one or more pump wavelengths, each of the one or more pump wavelengths comprising a center wavelength of light. In some embodiments, each of the one or more pump wavelengths within a particular pump signal 32 can comprise a center wavelength that is substantially different from the center wavelengths of the other pump wavelengths within the particular pump signal 32. Pump source 30 can comprise any device or combination of devices capable of generating one or more pump signal wavelengths at desired power levels and wavelengths. For example, pump source 30 can comprise a solid state laser, such a Nd:YAG or Nd:YLF laser, a semiconductor laser such as a Ytterbium doped fiber laser, a laser diode, a cladding pump fiber laser, or any combination of these or other light sources.

In this example, pump signal 32a co-propagates through span 20 in relation to signal 16, while pump signal 32b counter-propagates through span 20 in relation to optical signal 16. As used throughout this document, the term "co-propagates" or "co-propagating" refers to a condition where, for at least some time at least a portion of the pump signal propagates through the gain medium or optical fiber in the same direction as at least one wavelength of the optical signal being amplified. In addition, the term "counter-propagates" or "counter-propagating" refers to a condition where at least a portion of a pump signal propagates through a gain medium or optical fiber in a direction counter to the direction of the optical signal being amplified. Although system 10 introduces pump signal 32a and pump signal 32b to span 20 in this example, one or more of pump signals 32a and 32b could be eliminated in other embodiments.

Conventional optical communication systems have typically implemented one or more booster amplifiers to amplify a multiple wavelength optical signal to approximately a maximum threshold power level before launching such optical signal into a communication span or transmission fiber. For example, conventional optical communication systems typically include one or more booster amplifiers that are capable of receiving and amplifying the wavelengths of a multiple wavelength optical signal to prepare those signals for transmission over a transmission fiber or communication span. In most cases, the one or more booster amplifiers operate to amplify the multiple wavelength optical signal to at least eighty percent (80%) of a maximum threshold power level for the system. A "maximum threshold power level" is the optical signal power level, at which the system performance, as measured at the receive end of the communication span, no longer improves, by further increasing the optical signal power level.

The maximum threshold power level of a system is based at least in part on the configuration of the system and the type of fiber implemented in the transmission medium or communication span. In most cases, one or more non-linear interactions within the communication span typically limit and/or determine the maximum threshold power level for the system. In other words, the maximum threshold power level limits the maximum power level associated with the optical signal wavelengths as they are communicated through the transmission medium of the system. These non-linear effects can comprise, for example, four wave mixing, cross-phase modulation, self-phase modulation, stimulated Brillouin scattering, or a combination of these or other non-linear effects.

In most cases, non-linear interactions limit the maximum power of the multiple wavelength optical signals and lead to interference within the wavelengths associated with the multiple wavelength signals. By limiting the maximum power of the multiple wavelength optical signals, the non-linear interactions can also limit the communication span length or transmission distance for a particular system. That is, the non-linear interactions can limit the maximum unrepeatered transmission distance of the optical signals.

As discussed above, conventional optical communication systems typically seek to maximize the launch power of the optical signal before introducing such signal to the communication span or transmission medium. In most cases, these conventional systems typically implement one or more booster amplifiers to amplify the optical signals to approximately the maximum threshold power level of the system before introducing such optical signal into a communication span or transmission fiber. By introducing such optical signals into the communication span at approximately the maximum threshold power level, non-linear interactions, such as SBS, can limit the maximum unrepeatered transmission distance of these optical signals in the conventional system. As a result, the optical signals of the conventional systems typically achieve reach the maximum threshold power level at or near the beginning of the communication span.

Unlike the conventional systems, system 10 introduces multiple wavelength signal 16 to communication span 20 at or near a minimum threshold power level and amplifies signal 16 to the maximum threshold power level while communicating signal 16 through span 20. The minimum threshold power level of a system is based at least in part on the configuration of system 10 and the type of fiber implemented in span 20. In most cases, Multi-Path Interference ("MPI") typically limits and/or determines the minimum threshold power level for the system. In other words, the minimum threshold power level limits the maximum amount of gain that can be introduced to the optical signal wavelengths as they are communicated through the transmission medium of the system. As used throughout this document, the phrase "minimum threshold power level" refers to a power level of an optical signal to which a maximum amount of gain can be introduced to the signal to bring the power level of the signal to the maximum threshold power level. A "maximum amount of gain" is the amount of gain at which any appreciable increase in gain to the signal will introduce performance penalty larger than the benefit from the gain increase, mainly due to MPI.

In this particular embodiment, terminal 11 comprises a boosterless end terminal that uses at least a portion of the optical fiber of span 20 as a distributed Raman amplifier that amplifies signal 16 from the minimum threshold power level to the maximum threshold power level while signal 16 traverses span 20. The term "boosterless end terminal" refers to an end terminal that introduces one or more optical signal wavelengths to a transmission fiber at approximately a minimum threshold power level. Moreover, a boosterless end terminal is one that is substantially free from an amplifier that amplifies a multiple wavelength optical signal to approximately the maximum threshold power level of the communication system before introducing such optical signal into the communication span or transmission fiber.

In this example, boosterless end terminal 11 introduces multiple wavelength optical signal 16 to span 20 at approximately the minimum threshold power level. The minimum threshold power level of signal 16 can comprise, for example, approximately minus twelve (−12) dBm or more, minus ten (−10) dBm or more, minus six (−6) dBm or more, or any other appropriate value. In most cases, the minimum threshold power level of signal 16 can comprise, for example, approximately zero dBm or less, minus two (−2) dBm or less, minus four (−4) dBm or less, or any other appropriate value. Boosterless end terminal 11 also operates to introduce pump signal 32a to span 20 to amplify signal 16 to the maximum threshold power level of system 10. In this particular example, pump signal 32a co-propagates through span 20 in relation to signal 16. In most cases, pump signal 32a can comprise a power level of, for example, one-half (½) watt or more, one (1) watt or more, two (2) watts or more, two and one-half (2½) watts or more.

One aspect of this disclosure recognizes that the length of span 20 (e.g., the distance between end terminals 11 and 13) can be increased by introducing signal 16 to span 20 at approximately the minimum threshold power level and amplifying signal 16 to the maximum threshold power level while communicating signal 16 through span 20. That is, the reach of system 10 and/or the distance multiple wavelength signal 16 can be communicated through span 20 can be increased by introducing signal 16 to span 20 at approximately the minimum threshold power level and amplifying signal 16 using pump signal 32a to the maximum threshold power level within span 20. Conventional design approaches may not have recognized this technique as advantageous, because co-propagating a pump signal with a multiple wavelength optical signal for an extended period can degrade the optical signal. However, introducing signal 16 to span 20 at approximately the minimum threshold power level and amplifying signal 16 using pump signal 32a to the maximum threshold power level within span 20 can advantageously increase the reach of system 10 by extending or delaying the point at which signal 16 reaches the maximum threshold power level within span 20.

In this example, introducing signal 16 to span 20 at approximately the minimum threshold power level operates to increase the distance over which pump signal 32a effectively interacts (e.g., transfer energy or amplify) with signal 16 within communication span 20. Increasing the distance over which pump signal 32a effectively interacts with signal 16 within communication span 20 can advantageously increase the reach of system 10 by extending or delaying the point at which signal 16 reaches the maximum threshold power level within span 20. For example, the point at which signal 16 reaches the maximum threshold power level can be approximately thirty (30) km or more from terminal 11, forty (40) km or more from terminal 11, or fifty (50) km or more from terminal 11. In some cases, this can extend the reach of system 10 by, for example, approximately thirty (30) km or more, forty (40) km or more, or fifty (50) km or more.

In most cases, amplifying signal 16 from approximately the minimum threshold power level to approximately the maximum threshold power level within span 20 tends to increase the length of time that signal 16 and pump signal 32a interact within span 20. That is, the one or more pump wavelengths of pump signal 32a operate to introduce a gain to the optical signal wavelengths of signal 16 over an increased length of span 20. Introducing a gain to signal 16 over an increased length of span 20 can advantageously maintain optical signal wavelengths of signal 16 at a power level that is higher than a comparable optical signal that amplifies its signals to approximately the maximum threshold power level before introducing those signals to the communication span.

Introducing signal 16 to span 20 at approximately the minimum threshold power level can also operate to maintain a power level of the optical signal wavelengths 15 of signal 16 at a relatively higher power level than a comparable optical signal that amplifies its signals to approximately the maximum threshold power level before introducing those signals to the communication span. In most cases, increasing the length of span 20 over which pump signal 32a effectively interacts with signal 16 operates to maintain the power level of pumps signal 32a at a relatively higher-level. Maintaining the power level of pump signal 32a at a relatively higher power level can maintain a power level of the optical signal wavelengths 15 of signal 16 at a relatively higher power level over at least a portion of communication span 20.

Another aspect of this disclosure recognizes that system costs can be reduced by implementing a boosterless terminal, and that system performance can be maintained or even improved by implementing one or more pump signals 32 that amplify multiple wavelength optical signal 16 to the maximum threshold power level as signal 16 traverses communication span 20.

In various embodiments, pump signal 32a can include one or more fractional Raman order pump wavelengths and one or more integer Raman order pump wavelengths. A "fractional order Raman pump wavelength" is a pump wavelength having a Raman gain peak that is not an integer multiple of one-stokes shift (e.g., approximately 13.2 THz) from any optical signal wavelength being communicated through the system. In other words, a fractional Raman order pump wavelength can comprise any pump wavelength having a Raman gain peak that is a non-integer multiple of one-stokes shift from all of optical signals 15a-15n.

In those embodiments, pump signal 32a can include a plurality of first Raman order pump wavelengths and a plurality of fractional Raman order pump wavelengths that are used to amplify at least the first Raman order pump wavelengths. Although pump signal 32a can include a plurality of first and fractional Raman order pump wavelengths, any other combination of integer and/or fractional Raman order pump wavelengths can be used without departing from the scope of the present disclosure. In other embodiments, pump signal 32b can include one or more integer Raman order pump wavelengths and one or more fractional Raman order pump wavelengths. In other embodiments, both pump signal 32a and 32b can include one or more integer Raman order pump wavelengths and one or more fractional Raman order pump wavelengths.

One aspect of this disclosure recognizes that the length of span 20 (e.g., the distance between end terminals 11 and 13) can be increased by implementing one or more pump fractional Raman pump wavelengths within pump signal 32a and/or pump signal 32b. That is, the reach of system 10 and/or the distance multiple wavelength signal 16 can be communicated through span 20 can be increased by using one or more fractional Raman order pump wavelengths within pump signals 32a and/or 32b. Conventional design approaches may not have recognized this technique as advantageous, because introducing a fractional Raman order pump wavelength to amplify an integer Raman order pump wavelength tends to reduce the efficiency of the energy transfer between the pump wavelengths. However, introducing a relatively lower gain to the integer Raman order pump wavelengths over an increased length of span 20 can advantageously increase the reach of system 10 by extending or delaying the point at which system 10 experiences its maximum gain within span 20.

In most cases, implementing one or more fractional Raman order pump wavelengths within pump signal 32a and/or pump signal 32b tends to reduce the rate at which the first Raman order pump wavelengths deplete the optical power associated with the fractional Raman order pump wavelengths. That is, implementing one or more fractional Raman order pump wavelengths reduces the efficiency of the energy transfer from the fractional Raman order pump wavelengths to the first Raman order pump wavelengths. Because of the reduced efficiency, the fractional Raman order pump wavelengths operate to introduce a relatively lower gain to the first Raman order pump wavelengths over an increased length of span 20. Introducing a relatively lower gain to the first Raman order pump wavelengths over an increased length of span 20 can advantageously maintain the first Raman order pump wavelengths at a power level that is higher than a comparable pump signal that implements only inter Raman order pump wavelengths over at least a portion of span 20.

In this embodiment, system 10 comprises an unrepeatered system. In alternative embodiments, system 10 can comprise a repeater system that includes a plurality of communication spans 20. Where communication system 10 includes a plurality of communication spans 20, system 10 can also include one or more in-line amplifiers. The in-line amplifiers couple to one or more spans 20 and operate to amplify signal 16 as it traverses system 10. In that embodiment, two or more spans can collectively form a first optical link. Moreover, such a repeater system could include any number of additional links coupled to the first link. For example, the first link could comprise one optical link of a multiple link system, where each link is coupled to other links through, for example, optical regenerators.

Finally, where system 10 comprises a repeater system, such system may further include one or more access elements. For example, the access element could comprise an add/drop multiplexer, a cross connect, or another device operable to terminate, cross connect, switch, route, process, and/or provide access to and from system 10 and another system or communication device. System 10 may also include one or more lossy elements (not explicitly shown) and/or gain elements capable of at least partially compensating for the lossy element coupled between spans 20. For example, the lossy element could comprise a signal separator, a signal combiner, an isolator, a dispersion compensating element, a circulator, or a gain equalizer.

Figure 2:
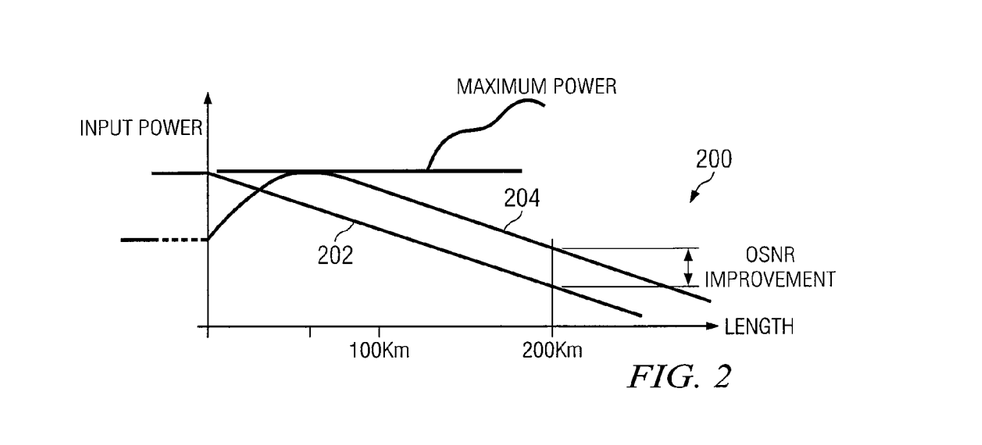
FIG. 2 is a graph comparing a first optical signal communicated from an end terminal that includes a booster amplifier to a second optical signal communicated from a boosterless end terminal.

FIG. 2 is a graph comparing a first optical signal 202 communicated from an end terminal that includes a booster amplifier to a second optical signal communicated from a boosterless end terminal of system 200. In various embodiments, system 200 can be substantially similar in structure and function to unrepeatered system 10 of FIG. 1. The particular parameters, components, and power levels of system 200 and power levels of optical signals 202 and 204 illustrated in FIG. 2 are for illustrative purposes only and are not intended to limit the scope of the present disclosure. It should be appreciated that other combinations of parameters, components, and power levels may be used without departing from the scope of the present disclosure. In the illustrated embodiment, system 200 comprises a maximum threshold power level of approximately thirteen (+13) dBm and a minimum threshold power level of approximately minus seven (−7) dBm. Although the maximum and minimum threshold power levels comprise +13 and −7 dBm, respectively, in this example, any other appropriate maximum and minimum threshold power levels may be used without departing from the scope of the present disclosure.

In this example, system 200 includes a communication span that comprises standard single mode fiber that facilitates the communication of one or more optical signals through system 200. In a first embodiment, the communication span of system 200 receives first optical signal 202 from the end terminal that includes a booster amplifier at approximately a maximum threshold power level for system 200. In that embodiment, the booster amplifier operates to amplify first optical signal 202 to approximately the maximum threshold power level of system 200 (e.g., +13 dBm) before first optical signal 202 is introduced to the communication span of system 200.

In a second embodiment, the communication span of system 200 receives second optical signal 204 from a boosterless end terminal at approximately a minimum threshold power level for system 200 (e.g., −7 dBm). In that embodiment, the boosterless end terminal is substantially free from an amplifier that amplifies second optical signal 204 to approximately the maximum threshold power level of system 200 before introducing second optical signal 204 into the communication span.

In the second embodiment, system 200 also includes a pump source that is capable of generating one or more pump signals for introduction to the communication span of system 200. In some cases, the structure and function of the pump source and pump signal can be substantially similar to pump source 30 and pump signal 32a of FIG. 1, respectively. In that embodiment, the pump source operates to introduce a pump signal that co-propagates with optical signal 204 as optical signal 204 traverses a portion of the communication span of system 200. Although the pump signal co-propagates with optical signal 204 in this example, at least a portion of the pump signal could counter-propagate with optical signal 204 without departing from the scope of the present disclosure. In this particular embodiment, the pump signal amplifies second optical signal 204 to the maximum threshold power level of system 200 as second optical signal 204 traverses the communication span. In various embodiments, the pump source may be capable of generating a pump signal having a total power of, for example, 0.5 watts, one watt, 2.5 watts, or any other appropriate power level.

In this example, line 202 represents the power level of the first optical signal as the first optical signal is communicated through the communication span of system 200, while line 204 represents the power level of the second optical signal as the second optical signal is communicated through the communication span of system 200. In this example, the horizontal axis represents the distance that optical signals 202 and 204 have traversed through the communication span of system 200, while the vertical axis represents a power level of the optical signal.

This graph illustrates that amplifying second optical signal 204 from a minimum threshold power level to a maximum threshold power level as optical signal 204 traverses the communication span can advantageously maintain second optical signal 204 at a power level that is higher than a power level associated with first optical signal 202 over at least a portion of the communication span. In particular, after each of optical signals 202 and 204 traverses approximately thirty kilometers of the communication span, the power level of second optical signal 204 becomes higher than a power level of first optical signal 202. Moreover, after each of optical signals 202 and 204 traverses approximately thirty kilometers of the communication span, the power level of second optical signal 204 is maintained at a higher power level than the power level of first optical signal 202. Because second optical signal 204 is at a higher power level than first optical signal 202 the reach of system 200 and/or the distance second optical signal 204 can be communicated through the communication span can advantageously be increased.

This graph further illustrates that amplifying second optical signal 204 from a minimum threshold power level to a maximum threshold power level as optical signal 204 traverses the communication span advantageously extends or delays the point at which the second optical signal 204 reaches its maximum power level within the communication span when compared to the first optical signal 202. In particular, the maximum signal power level of first optical signal 202 occurs when optical signal 202 is introduced to the communication span, while the maximum signal power level of the second optical signal 204 occurs after second optical signal 204 traverses approximately forty-five kilometers of the communication span.

Figure 3:
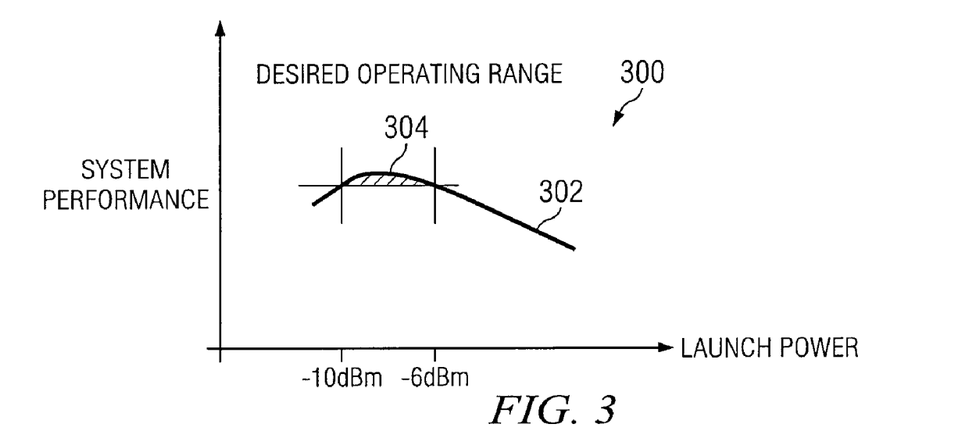
FIG. 3 is a graph illustrating the optical performance of an optical signal after traversing a communication span of optical communication system as the launch power of optical signal is varied.

FIG. 3 is a graph illustrating the optical performance of an optical signal 302 after traversing a communication span of optical communication system 300 as the launch power of optical signal 302 is varied. In various embodiments, system 300 can be substantially similar in structure and function to system 10 of FIG. 1. The particular parameters, components, and power levels of system 300 and launched power level of optical signal 302 illustrated in FIG. 3 are for illustrative purposes only and are not intended to limit the scope of the present disclosure. It should be appreciated that other combinations of parameters, components, and power levels may be used without departing from the scope of the present disclosure. In the illustrated embodiment, system 300 comprises a maximum threshold power level of approximately thirteen (+13) dBm. Although the maximum threshold power level comprises +13 dBm in this example, any other appropriate maximum threshold power level may be used without departing from the scope of the present disclosure.

In this example, system 300 includes a communication span that comprises standard single mode fiber that facilitates the communication of one or more optical signals through system 300. The communication span of system 300 receives optical signal 302 from a boosterless end terminal at a power level that varies. In that embodiment, the boosterless end terminal is substantially free from an amplifier that amplifies optical signal 302 to approximately the maximum threshold power level of system 300 before introducing optical signal 302 into the communication span. In this particular embodiment, the power level of optical signal 302 received by the communication span varies between −12 dBm and 2 dBm. Although the power level of optical signal 302 varies between −12 dBm and 2 dBm in this example, any other appropriate range may be used without departing from the scope of the present disclosure.

In one particular embodiment, system 300 also includes a pump source that is capable of generating one or more pump signals for introduction to the communication span of system 300. In some cases, the structure and function of the pump source and pump signal can be substantially similar to pump source 30a and pump signal 32a of FIG. 1, respectively. In that particular embodiment, the pump source operates to introduce a pump signal that co-propagates with optical signal 302 as optical signal 302 traverses a portion of the communication span of system 300. Although the pump signal co-propagates with optical signal 302 in this example, at least a portion of the pump signal could counter-propagate with optical signal 302 without departing from the scope of the present disclosure. In this particular embodiment, the pump signal amplifies optical signal 302 to the maximum threshold power level of system 300 as optical signal 302 traverses the communication span. In various embodiments, the pump source may be capable of generating a pump signal having a total power of, for example, 0.5 watts, one watt, 2.5 watts, or any other appropriate power level.

In this example, line 302 represents the performance of the optical signal after traversing the communication span of system 300. The horizontal axis represents a power level of the optical signal received by the communication span of system 300, while the vertical axis represents the performance of the optical signal 302.

This graph illustrates a desired or optimal range of power levels 304 for the optical signal received by the communication span of system 300. The phrase "desired range of power levels" or "optimal range of power levels" refers to one or more power levels that maintain and/or achieve a satisfactory Q-factor for system 300. In this particular embodiment, system 300 has a desired or optimal range of power levels between −10 dBm and −6 dBm. That is, when optical signal 302 is introduced to the communication span of system 300 at a power level between −10 and −6 dBm, the Q-factor of system 300 is maintained within an acceptable range. Although the desired or optimal range of power levels for the optical signal received by the communication span is between −10 and −6 dBm in this example, any other appropriate minimum threshold power level may be used without departing from the scope of the present disclosure. The selection of the optimal or desired range of power levels is based at least in part on the number of channels or wavelengths associated with optical signal 302, the spacing between the wavelengths associated with optical signal 302, the bit rate of optical signal 302, the nonlinear coefficient of the optical fiber of the communication span, the effective area of the optical fiber, and chromatic dispersion.

Figure 4:
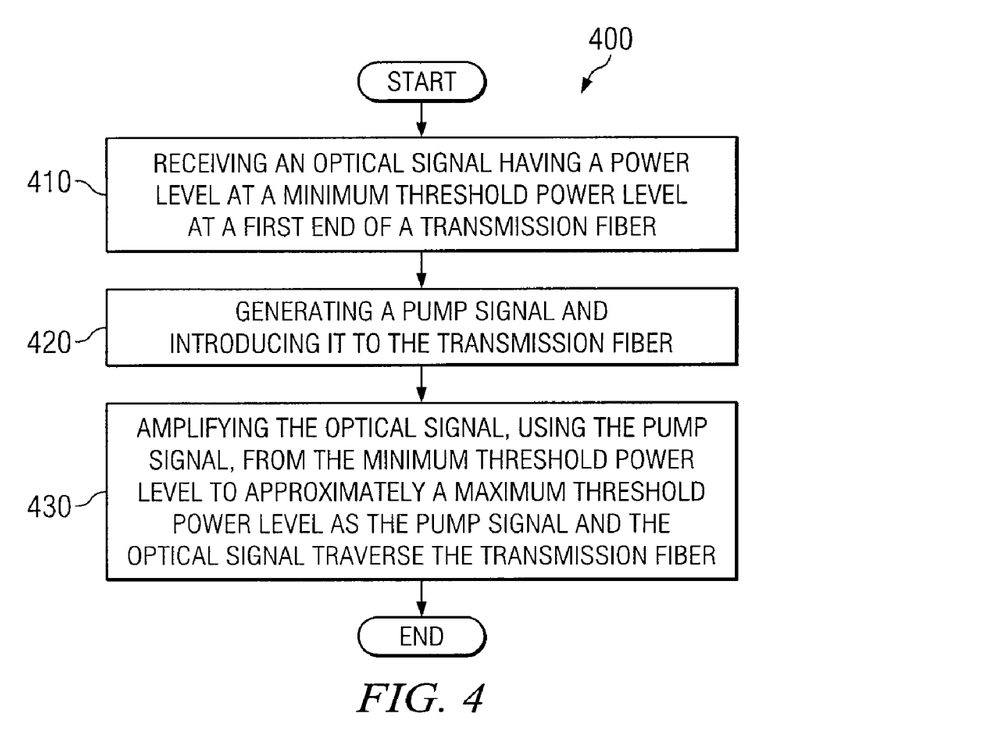
FIG. 4 is a flow chart showing one example of a method of amplifying an optical signal from approximately a minimum threshold power level to approximately a maximum threshold power level in a communication span of an unrepeatered optical communication system.

FIG. 4 is a flow chart showing one example of a method 400 of amplifying an optical signal from approximately a minimum threshold power level to approximately a maximum threshold power level in a communication span of an unrepeatered optical communication system. In one particular embodiment, the optical signal may be amplified within unrepeatered system 10 of FIG. 1. In various embodiments, system 10 can include one or more transmitters 12a-12n capable of generating a plurality of optical signal wavelengths 15, each comprising a center wavelength of light. In some embodiments, transmitters 12 may include a forward error correction (FEC) module capable improving the Q-factor of signals 15 and the bit-error rate of system 10. In other embodiments, system 10 can also include a combiner 14 capable of combining each of the plurality of optical signal wavelengths 15 into a multiple wavelength signal 16 for communication across communication span 20.

In this example, method 400 begins at step 410 by receiving an optical signal 16 comprising a plurality of optical signal wavelengths 15 at a first end of a communication span 20. In this example, boosterless end terminal 11 introduces multiple wavelength optical signal 16 to span 20 at approximately the minimum threshold power level. The minimum threshold power level of signal 16 can comprise, for example, approximately minus twelve (−12) dBm or more, minus ten (−10) dBm or more, minus six (−6) dBm or more, or any other appropriate value.

Boosterless end terminal 11 also includes a first pump source 30a capable of generating a first pump signal 32a for introduction to span 20. Pump signal 32a can comprise one or more pump wavelengths, each of the one or more pump wavelengths comprising a center wavelength of light. In some embodiments, each of the one or more pump wavelengths within pump signal 32a can comprise a center wavelength that is substantially different from the center wavelengths of the other pump wavelengths within pump signal 32a.

In this example, pump source 30a generates at least one pump signal 32a and introduces pump signal 32a to communication span 20 at step 420. In this particular example, pump signal 32a co-propagates through span 20 in relation to signal 16. In most cases, pump signal 32a can comprise a power level of, for example, one-half (½) watt or more, one (1) watt or more, two (2) watts or more, two and one-half (2-½) watts or more.

In this example, system 10 operates to amplify signal 16 from approximately a minimum threshold power level to approximately a maximum threshold power level within span 20 at step 430. In this example, pump signal 32a co-propagates through span 20 in relation to signal 16 and operates to amplify signal 16 within communication span 20. Although pump signal 32a co-propagates with optical signal 16 in this example, at least a portion of pump signal 32a could counter-propagate with optical signal 16 without departing from the scope of the present disclosure.

In various embodiments, introducing signal 16 to span 20 at approximately the minimum threshold power level and amplifying signal 16 to the maximum threshold power level while communicating signal 16 through span 20 can increase the reach of system 10. That is, the reach of system 10 and/or the distance multiple wavelength signal 16 can be communicated through span 20 can be increased by introducing signal 16 to span 20 at approximately the minimum threshold power level and amplifying signal 16 using pump signal 32a to the maximum threshold power level within span 20. For example, the point at which signal 16 reaches the maximum threshold power level can be approximately thirty (30) km or more from terminal 11, forty (40) km or more from terminal 11, or fifty (50) km or more from terminal 11. In some cases, this can extend the reach of system 10 by, for example, approximately thirty (30) km or more, forty (40) km or more, or fifty (50) km or more from.

In other embodiments, introducing signal 16 to span 20 at approximately the minimum threshold power level can operate to maintain a power level of signal 16 at a relatively higher power level than a comparable optical signal that amplifies its signals to approximately the maximum threshold power level before introducing those signals to the communication span. In most cases, increasing the length of span 20 over which pump signal 32a effectively interacts with signal 16 operates to maintain the power level of pumps signal 32a at a relatively higher-level. Maintaining the power level of pump signal 32a at a relatively higher power level can maintain a power level of the optical signal wavelengths 15 of signal 16 at a relatively higher power level over at least a portion of communication span 20.

Although the present invention has been described in several embodiments, a myriad of changes, variations, alternations, transformations, and modifications may be suggested to one skilled in the art, and it is intended that the present invention encompass such changes, variations, alterations, alterations, transformations, and modifications as falling within the spirit and the scope of the appended claims.

What is claimed is:

1. An optical communication system comprising:
a transmission fiber operable to receive one or more optical signals at a first end of the transmission fiber and one or more pump signals at the first end of the transmission fiber, the one or more optical signals comprising one or more optical signal wavelengths and a power level at within twenty percent of a minimum threshold power level the one or more pump signals co-propagating with at least a portion of the one or more optical signals over at least a portion of the transmission fiber, wherein the first end of the transmission fiber is coupled to a transmitter end terminal adapted to generate the one or more optical signals received at the first end of the transmission fiber; and
wherein the one or more pump signals operate to amplify the one or more optical signals to approximately a maximum threshold power level as the one or more pump signals and the one or more optical signals traverse the portion of the transmission fiber, wherein the power level of the one or more optical signals as received into the transmission fiber is less than the maximum threshold power level.

2. The system of claim 1, wherein the transmission fiber between the first end of the transmission fiber and a second end of the transmission fiber is substantially free from optical components that require electrical power.

3. The system of claim 1, wherein at least a portion of the transmission fiber comprises a distributed Raman amplifier that amplifies the one or more optical signals through Raman gain.

4. The system of claim 1, wherein the transmission fiber includes one or more optical isolators in the Raman gain portion of the transmission fiber.

5. The system of claim 1, wherein the transmission fiber receives another one or more pump signals that counter-propagates within the transmission fiber with at least a portion of the one or more optical signals and wherein the another one or more pump signals interacts with the one or more optical signals as the another one or more pump signals traverses at least a portion of the transmission fiber.

6. The system of claim 1, wherein the one or more optical signals received by the transmission fiber comprises a power level of −2 dBm or less.

7. The system of claim 1, further comprising:
a receiving terminal coupled to a second end of the transmission fiber, the second end terminal operable to receive the one or more optical signals after traversing the transmission fiber, wherein the transmission fiber between the first end of the transmission fiber and the second end of the transmission fiber is substantially free from optical components that require electrical power.

8. The system of claim 7, wherein the transmitter end terminal comprises a first pump source coupled to the first end of the transmission fiber, the first pump source adapted to generate the one or more pump signals for receipt by the transmission fiber, and wherein the receiving terminal comprises a second pump source coupled to the second end of the transmission fiber, the second pump source adapted to generate another one or more pump signals that counter-propagates within the transmission fiber with at least a portion of the one or more optical signals.

9. The system of claim 1, further comprising a forward error correction module operable to encode a forward error correction sequence onto one or more of the optical signal wavelengths.

10. The system of claim 1, wherein the one or more pump signals operate to amplify the one or more optical signals such that a maximum power of the one or more optical signals occurs more than 30 kilometers in optical distance from the first end of the transmission fiber.

11. The system of claim 1, wherein the one or more pump signals include at least one integer Raman order pump wavelength and at least one fractional Raman order pump wavelength.

12. An unrepeatered optical communication system comprising:
a boosterless end terminal adapted to generate one or more optical signals and to introduce the one or more optical signals to a first end of a transmission fiber, the one or more optical signals introduced to the first end of the transmission fiber comprising a power level at within twenty percent of a minimum threshold power level; and
a pump source coupled to the first end of the transmission fiber, the pump source adapted to generate one or more pump signals and to introduce the one or more pump signals to the first end of the transmission fiber, wherein the one or more pump signals operates to amplify the one or more optical signals to approximately a maximum threshold power level as the one or more pump signals traverses the portion of the transmission fiber, and wherein the one or more pump signals co-propagates with at least a portion of the one or more optical signals over at least a portion of the transmission fiber, wherein the power level of the one or more optical signals as introduced at the first end of the transmission fiber is less than the maximum threshold power level; and
a receiving end terminal coupled to a second end of the transmission fiber the second end terminal operable to receive the one or more optical signals after traversing the transmission fiber, wherein the transmission fiber between the first end of the transmission fiber and a second end of the transmission fiber is substantially free from optical components that require electrical power.

13. The system of claim 12, wherein the one or more optical signals received by the transmission fiber comprises a power level that is −2 dBm or less.

14. The system of claim 12, wherein the boosterless end terminal is substantially free from an amplifier that amplifies the one or more optical signals to approximately the maximum threshold power level of the communication system before introducing the one or more optical signals into the transmission fiber.

15. The system of claim 11, further comprising:
another pump source coupled to the second end of the transmission fiber and capable of generating another one or more pump signals that counter-propagates within the transmission fiber with at least a portion of the one or more optical signals.

16. The system of claim 12, further comprising one or more optical isolators in the Raman gain portion of the transmission fiber.

17. The system of claim 12, wherein the boosterless end terminal includes the pump source.

18. The system of claim 12, wherein the one or more pump signals operate to amplify the one or more optical signals such that a maximum power of the one or more optical signals occurs more than 30 kilometers in optical distance from the first end of the transmission fiber.

19. The system of claim 12, wherein the one or more pump signals include at least one integer Raman order pump wavelength and at least one fractional Raman order pump wavelength.

20. A method of communicating an optical signal in an unrepeatered optical communication system, the method comprising:
introducing one or more optical signals at a first end of a transmission fiber, the one or more optical signals comprising one or more optical signal wavelengths and comprising a power level at within twenty percent of a minimum threshold power level;
generating one or more pump signals comprising one or more pump wavelengths; and
introducing the one or more pump signals to the first end of the transmission fiber, the one or more pump signals co-propagating with at least a portion of the one or more optical signals over at least a portion of the transmission fiber, the one or more pump signals amplifying the one or more optical signals to approximately a maximum threshold power level as the one or more pump signals and the one or more optical signals traverse the portion of the transmission fiber, wherein the power level of the one or more optical signals as introduced at the first end of the transmission fiber is less than the maximum threshold power level; and
receiving the one or more optical signals at a second end of the transmission fiber, wherein the transmission fiber between the first end of the transmission fiber and the second end of the transmission fiber is substantially free from optical components that require electrical power.

21. The method of claim 20, wherein the one or more optical signals received by the transmission fiber comprises a power level that is −2 dBm or less.

22. The method of claim 20, further comprising:
introducing another one or more pump signals to the transmission fiber, the another one or more pump signals counter-propagating within the transmission fiber with at least a portion of the one or more optical signals.

23. The method of claim 20, wherein the one or more pump signals operate to amplify the one or more optical signals such that a maximum power of the one or more optical signals occurs more than 30 kilometers in optical distance from the first end of the transmission fiber.

24. The method of claim 20, wherein the one or more pump signals include at least one integer Raman order pump wavelength and at least one fractional Raman order pump wavelength.

* * * * *

UNITED STATES PATENT AND TRADEMARK OFFICE
CERTIFICATE OF CORRECTION

PATENT NO. : 7,742,223 B2
APPLICATION NO. : 11/277332
DATED : June 22, 2010
INVENTOR(S) : Puc et al.

It is certified that error appears in the above-identified patent and that said Letters Patent is hereby corrected as shown below:

Column 2
Line 13, after "of" insert --an--
Line 14, after "of" insert --an--

Column 3
Line 20, change "capable improving" to --capable of improving--
Line 38, change "$Q=[M_H-M_L] \div [\Delta_H+\Delta_L]$" to --$Q=[M_H-M_L] \div [\Delta_H+\Delta_L]$--

Column 6
Line 51, change "achieve reach the maximum" to --reach the maximum--

Column 7
Line 5, change "introduce performance penalty" to --introduce a performance penalty--
Line 37, change "more, two and one-half" to --more, or two and one-half--

Column 8
Line 32, change "pumps signal 32*a*" to --pump signal 32*a* --

Column 9
Line 10, change "20 can be" to --20 and can be--

Column 11
Line 23, change "span can" to --span and can--

Column 13
Line 47, change "20 can be" to --20 and can be--
Line 57, after "more" remove [from]
Line 66, change "pumps signal 32*a*" to --pump signal 32*a*--

Signed and Sealed this
Thirteenth Day of December, 2011

David J. Kappos
*Director of the United States Patent and Trademark Office*

Column 14
Lines 9-10, remove the second instance of [alterations,]